United States Patent
Agarossi et al.

(10) Patent No.: US 6,600,794 B1
(45) Date of Patent: Jul. 29, 2003

(54) METHOD AND DEVICE FOR NONLINEAR MAXIMUM LIKELIHOOD SEQUENCE ESTIMATION BY REMOVING NON-LINEAR INTER-SYMBOL-INTERFERENCE (ISI) FROM A RECEIVED SIGNAL

(75) Inventors: Luigi Agarossi, Concorezzo (IT); Sandro Bellini, Monza (IT); Fabrizio Bregoli, Gambara (IT); Pierangelo Migliorati, Seniga (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/248,141

(22) Filed: Feb. 10, 1999

(30) Foreign Application Priority Data

Feb. 12, 1998 (EP) .............................. 98200434

(51) Int. Cl.$^7$ .............................. H04L 27/06
(52) U.S. Cl. ...................... 375/341; 375/229; 375/232; 714/769
(58) Field of Search ................ 375/341, 340, 375/346, 232, 229, 233; 714/769; 360/46

(56) References Cited

U.S. PATENT DOCUMENTS

| | | | | |
|---|---|---|---|---|
| 4,993,047 A | * | 2/1991 | Moffatt et al. .............. | 375/261 |
| 5,111,484 A | * | 5/1992 | Karabinis .................... | 375/340 |
| 5,606,464 A | * | 2/1997 | Agazzi et al. ................ | 360/46 |
| 5,983,254 A | * | 11/1999 | Azadet ........................ | 708/300 |
| 6,118,832 A | * | 9/2000 | Mayrargue et al. ......... | 375/346 |
| 6,185,716 B1 | * | 2/2001 | Riggle ........................ | 714/769 |

OTHER PUBLICATIONS

Agazzi et al., When Can Tentative Decisions be Used to Cancel (Linear or Nonlinear) Intersymbol Interference? (With Application to Magnetic Recording Channels), 1995 IEEE International Conference, vol. 1, pp. 647–652.*

Jean et al., Nonlinear Equalization for Reduction of Nonlinear Distortion in High–Density Recording Channels, Feb. 1995, IEEE International Conference on, vol. 1, pp. 503–507.*

* cited by examiner

Primary Examiner—Shuwang Liu
(74) Attorney, Agent, or Firm—Michael E. Belk

(57) ABSTRACT

Maximum Likelihood Sequence Estimation (MLSE) is performed on a received signal that is affected by non-linear distortion. In particular, a cleaned signal is produced by removing non-linear inter-symbol-interference (ISI) through a Volterra canceller which is a simplified structure with respect to a Volterra Equalizer. The latter only processes the non-linear distortion. Finally, a Viterbi Detector is used to process the cleaned signal in the manner of a linear signal, and to estimate appropriate metrics accordingly.

16 Claims, 3 Drawing Sheets

METHOD AND DEVICE FOR NONLINEAR MAXIMUM LIKELIHOOD SEQUENCE ESTIMATION BY REMOVING NON-LINEAR INTER-SYMBOL-INTERFERENCE (ISI) FROM A RECEIVED SIGNAL

BACKGROUND OF THE INVENTION

The invention relates to a method as recited in the preamble of claim 1. Maximum Likelihood Sequence Estimation is a powerful signal detection tool and can be theoretically proved to give optimum detection both for linear and for non-linear systems.

In high-density optical recording, because of high linear density and reduced track pitch, the signal read-out is not a linear process anymore. A linear process will then impose an upper limit on storage density and therefore a non-linear approach should be taken. MLSE, although optimal, is not a reasonably straightforward and efficient implementation because of its computational complexity. The inventors, on the basis of a study carried out on a Volterra model of the non-linear optical channel drawn by the Hopkins analysis, have taken an improved approach. In fact, they have recognized that first and second orders of signal distortion are mutually uncorrelated. This has led to an innovated read-out processing, wherein linear and non-linear distortions are treated separately, while still using the MLSE structure that may be simplified dramatically. The Non-linear MLSE is based on a two-stage structure that performs linear as well as non-linear processing. The first stage has an adaptive matched filter and a non-linear Volterra canceller for pre-processing the signal to remove its non-linear distortion coefficient. The remainder signal is now only affected by linear distortion, and processed in the usual manner in an MLSE based on a Viterbi detector (VD).

SUMMARY TO THE INVENTION

In consequence, amongst other things, it is an object of the present invention to combine linear and non-linear detection mechanisms into an innovative linear and non-linear receiver structure. Now therefore, according to one of its aspects the invention is characterized according to the characterizing part of claim 1.

The invention also relates to a device arranged for implementing the above method. Further advantageous aspects of the invention are recited in dependent Claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
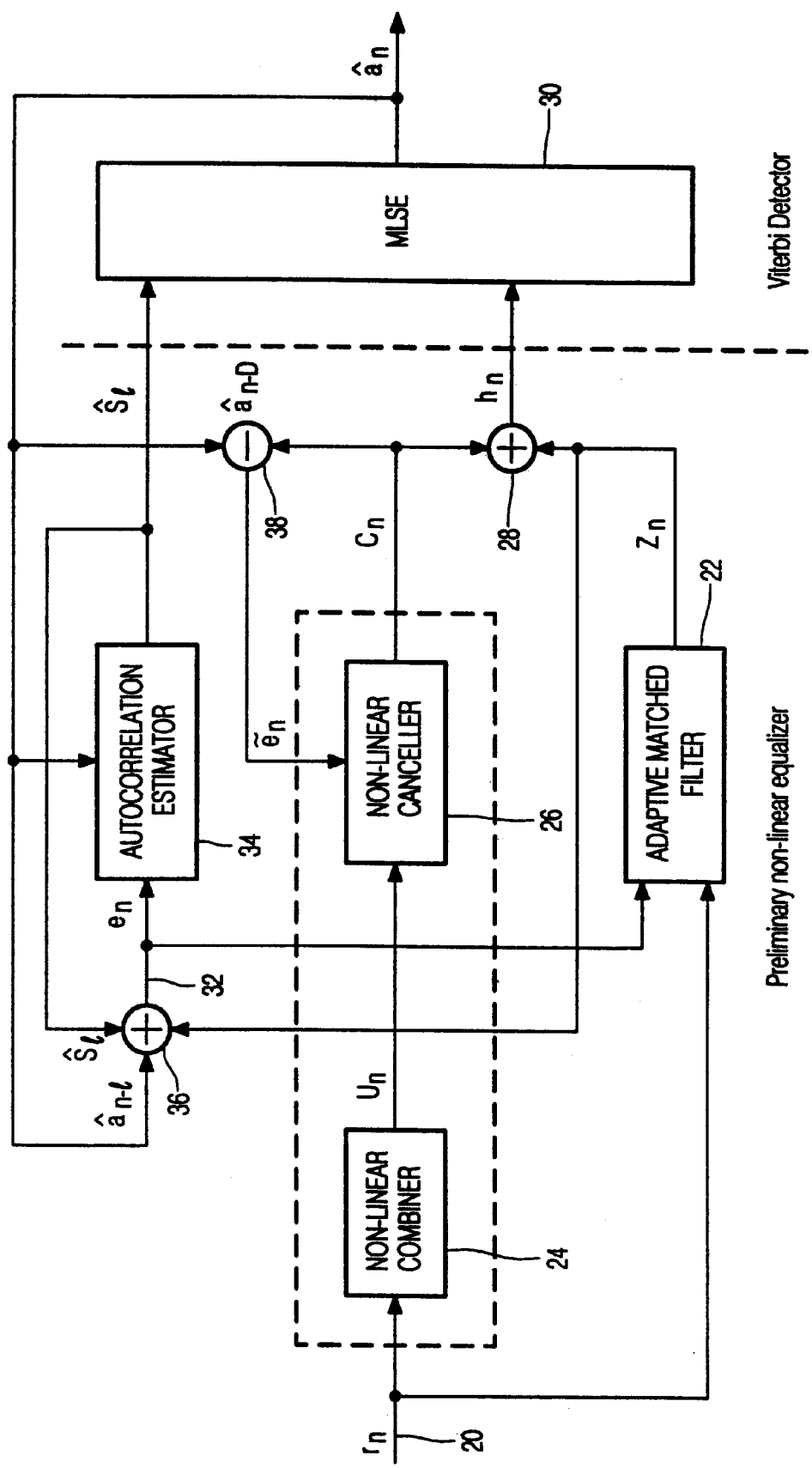
FIG. 1, a block diagram of a Non-linear Maximum Likelihood Sequence Estimation device.

FIG. 1 is a block diagram of a Non-linear Maximum Likelihood Sequence Estimation device. Input 20 receives the channel response $r_n$, that is first fed to adaptive matched filter 22, that produces signal $Z_n$, that is forwarded to adders 28 and 36. Furthermore, the same linear part $r_n$ is fed to non-linear combiner device 24 that produces signal $u_n$. The latter is fed to non-linear canceller device 26 that removes the non-linear InterSymbolInterference (ISI) in its output signal $c_n$. The latter signal is also forwarded to adder 28 and subtractor 38. The latter's output signal is retrocoupled again into non-linear canceller 26. In fact, the combination of blocks 24, 26 represents a non-linear Volterra Equalizer. The outputs of blocks 22, 26 are added in adder 28 to produce signal $h_n$, which is fed subsequently to Maximum Likelihood Sequence Estimator (MLSE) 30, that generates a signal $â_n$ in the way of a Viterbi Detector, and which output signal can be presented to further processing that is not relevant to the present invention. Further to the above, the output signal of Viterbi detector 30 is retrocoupled to subtractor 38, to autocorrelation estimator 34, and finally to adder 36. The output of this adder carries signal $e_n$, which is fed into autocorrelation estimator 34, and to adaptive matched filter 22. Finally, the output of autocorrelation estimator 34 is retrocoupled as well to adder 36. The detailed operation of the various blocks in FIG. 1 will be understood according to the various explicit operational equations that will be presented hereinafter.

The information density on optical discs can be raised by either increasing the operating spatial frequency or by decreasing the pitch between adjacent tracks. In high density systems the read-out signal is significantly affected by Inter Symbol Interference (ISI) and cross-talk (XT) among adjacent tracks. Various equalization algorithms may be used in a linear model for the optical channel. For high density recording, the linear model based on the Modulation Transfer Function (MTF) is no longer realistic, and non-linear terms must be also included.

A model close to the readout process was developed using optical scalar theory. The same approach was used to implement an optical physical model. This model has now been used for a nonlinear treatment based on a Volterra series.

The invention addresses the problem of nonlinear channel equalization, and presents an innovative Non-Linear Receiver (NLR) architecture for the nonlinear optical channel. Its performance is compared with that of Nonlinear Adaptive Volterra Equalizer (NAVE), Nonlinear Decision Feedback Equalizer (NDFE) and traditional MLSE for linear channels. The NLR has significantly better performance than all other algorithms, especially as the information density increases.

THE OPTICAL DISC MODEL

Earlier analysis is briefly described as follows. From the laser source the light propagates through the lens, towards the disc surface. Scalar theory describes the field propagation as a Fourier transform of the scalar input field. The disc reflectivity is modelled by using Fourier series analysis for periodic structures. The reflected light is equal to the phase profile of the disc times the incident field. The photodiode signal is the electro-optical conversion of the reflected field after back-propagation to the detector, i.e. after another Fourier transform. Generally, the physical analysis shows that a linear model for the optical system is not an accurate approximation for high density optical discs.

THE VOLTERRA MODEL

A mathematical model based on a Volterra series will characterize the nonlinear behaviour of the high density optical disc. The functional output relationship $y(t)=[x(t)]$ is:

$$y(t)=h_0+\int h_1(\tau)x(t-\tau)d\tau+\int\int h_2(\tau_1,\tau_2)x(t-\tau_1)x(t-\tau_2)d\tau_1 d\tau_2 \qquad (1)$$

The zero order term $h_0$ accounts for the response to a zero input. The first order kernel $h_1(t)$ is the impulse response of a linear system. Higher order kernels can be seen as higher order impulse responses, caused by the various orders of non-linearity of the system.

According to the scalar theory, the propagation of light is represented as a chain of linear transformations, followed by a quadratic distortion caused by the photodetection. Hence, a second order Volterra model leads to an accurate analytical description of the read-out process. The non-linear optical channel is fully characterized by its Volterra kernels, so an appropriate kernel identification procedure was developed. A simple way to identify Volterra kernels of second order systems is to probe the non-linear system with pairs of impulses. If we associate the amplitudes 0 and 1 to lands and pits present on the disc, test sequences may consist of two short pits at appropriate distances. The output signal from the physical optical model has been compared with the output of the non-linear model based on the Volterra series for an EFM (Eight to Fourteen Modulation) sequence input signal, at the CDDA standard parameters (minimum pit or land length is 0.9 micron), and also at higher densities. The output signals obtained from the optical model and from the Volterra series coincide. Simulations have shown that even at the CD-audio density, the contributions of second order terms are not negligible. Non-linear ISI becomes worse for higher information density.

THE PROPOSED NON-LINEAR RECEIVER

Reliable recovery of the information from the disc requires appropriate equalization techniques to get rid of both linear and nonlinear ISI. First, the performance of traditional receivers is considered for linear channels based on symbol-by-symbol decisions, like minimum Mean Square Error equalization (MSE) and Decision Feedback Equalization (DFE). Now, Maximum Likelihood Sequence Estimation (MLSE) is the optimum receiver mechanism for linear channels, since it bases the decision on the entire transmitted sequence. MSE, DFED and MLSE are analyzed in a linear channel is reported. As long as the channel is linear, MLSE outperforms MSE and DFE. However, MLSE shows a significant performance loss due to non-linearity, if the channel is more realistically described by the second order Volterra model. In this situation, specific equalizers for nonlinear channels, like Nonlinear Adaptive Volterra Equalizer (NAVE) and Nonlinear Decision Feedback Equalizer (NDFE), achieve performance close to MLSE, with lower complexity, so they should be preferred to MLSE. Nevertheless, they are not the optimum solution at high information densities, being based on a symbol-by-symbol approach.

On the other hand, an optimum sequence estimator for non-linear channels needs a bank of ML matched filters, where M is the cardinality of the symbol alphabet and L is the channel memory, followed by a modified Viterbi Detector (VD) with metrics taking care of both linear and non-linear terms. The complexity of this receiver is high. These considerations have triggered the idea of an innovative Non Linear Receiver (NLR) described below. Maximum Likelihood Sequence Estimation (MLSE), based on the entire transmitted sequence, is the optimum reception technique also in the case of non-linear channels. However, its computational complexity is too high. Fortunately, great simplifications are possible for an optical channel.

If r(t) is the received signal, n(t) the Additive White Gaussian Noise (AWGN) and y(t) the nonlinear optical channel output, r(t) can be expressed as r(t)=y(t)+n(t) (2)

The signal y(t) can be derived from Volterra kernels (Eq 1). By ignoring the zero order kernel $h_0$ can be rewritten as y(t)=y1(t)+y2(t) (3), where y1(t) is the first order and y2(t) is the second order kernel response, i.e. the non-linear contribution to the channel output.

Maximum likelihood sequence estimation needs to maximize the likelihood function $\lambda$ with respect to all possible transmitted sequences. In presence of AWGN, $\lambda$ can be expressed as follows:

$$\lambda = \frac{2}{N_0}\int y(t)r(t)dt - \frac{1}{N_0}\int y^2(t)dt \qquad (4)$$

Substituting Eqs. 2 and 3 in Eq. 4 produces the form of the likelihood function for a non-linear optical channel, as given by a second order Volterra kernel:

$$\lambda = \frac{2}{N_0}\int y_1(t)r(t)dt + \frac{2}{N_0}\int y_2(t)r(T)dt - \qquad (5)$$
$$\frac{1}{N_0}\int y_1^2(t)dt - \frac{1}{N_0}\int y_2^2(t)dt - \frac{2}{N_0}\int y_1(t)y_2(t)dt$$

Let us denote the five terms in Eq. 5 by $\alpha 1$, $\alpha 2$, $\beta 1$, $\beta 2$, $\beta 12$, respectively, i.e., $\lambda = \alpha 1 + \alpha 2 + \beta 1 + \beta 2 + \beta 12$ (6)

The terms $\alpha 1$ and $\beta 1$ in Eq. 6 are the same that would be required in the case of a linear channel, i.e., the cross-correlation between the received signal and the channel impulse response, and the energy of the channel impulse response. The terms $\alpha 2$, $\beta 2$ and $\beta 12$ in Eq. 6 represent further contributions due to non-linearity. $\beta 2$, the energy of the second order distortion, is a fourth order contribution that may be ignored. The third order term $\beta 12$ is on average close to zero, as the first and second order outputs y1(t) and y2(t) turn out to be uncorrelated. Then the only relevant non-linear term in Eq. 6 is $\alpha 2$, to account for the presence of nonlinear ISI.

Hence, if we remove non-linear ISI before maximum likelihood sequence estimation, with appropriate equalization structures such as Volterra equalizers, the metrics for the non-linear optical channel are the same as that for linear channels. THE

THE NON-LINEAR RECEIVER

To realize an adaptive Maximum Likelihood Sequence Estimator, for linear channels we combine an adaptive Matched Filter (MF) and a Cascaded Viterbi Detector (VD). To extend the MLSE structure to a nonlinear optical channel, we add a Non-Linear Canceller (NLC) to the adaptive MF, to suppress non-linear ISI. Then the VD can use the normal expressions for computing metrics. The combination of the NLC, the adaptive MF and the VD leads to the proposed Non-Linear Receiver (NLR). The adaptive MF can be easily implemented by means of a universal Finite Impulse Response (FIR) filter with N taps $g_i$, whose output $z_n$ at the n-th iteration is:

$$z_N = \sum_{i=1}^{N} g_i r_i \qquad (7)$$

Here ri are the samples of r(t) spaced by T seconds (T is the channel bit length). Using a steepest descent algorithm, the filter taps are adaptively updated according to:

$$g_i^{(n+1)} = g_i^{(n)} - \theta e_n r_i^{(n)}, \ 1 \leq i \leq N \qquad (8)$$
$$\hat{s}_l^{(n+1)} = \hat{s}_l^{(n)} + \phi(e_n \hat{a}_{n-1} + e_n \hat{a}_{n+1}), \ 1 \leq l \leq M \qquad (9)$$

Here $s_l$, $|l| \leq M$, are the M samples of the estimated autocorrelation of the linear part of the channel response, $â_n$ is the estimate of the transmitted bit $a_n$, $\theta$ and $\phi$ are the updating steps, and $e_n$ is the signal error:

$$e_n = z_n - \sum_{l=-M}^{+M} \hat{s}_l \hat{a}_{n-l} \qquad (10)$$

To suppress non-linear ISI, the samples ri are processed by a non-linear combiner, which outputs all possible products of samples pairs $r_h r_k$, $1 \leq h \leq N$, $1 \leq k \leq N$. If N is the number of linear taps of the adaptive MF, the combiner generates $N^2$ products $u_i$. Each combiner output is used as an input of a transversal FIR filter with $N^2$ taps $w_i$. The filter operates as an NLC, and its output $c_n$, at the n-th iteration, is given by $$c_n = \sum_{i=1}^{N^2} w_i u_i \qquad (11)$$

A steepest descent algorithm for updating the NLC coefficients produces:

$$w_i^{(n+1)} = w_i^{(n)} - \delta \tilde{e}_n u_i^{(n)}, \ 1 \leq i \leq N_2 \qquad (12)$$

where $\delta$ is the algorithm updating step, and $\bar{e}_n$ is the signal error derived with the estimation delay D:

$$\tilde{e}_n = c_n - \hat{a}_{n-D} \qquad (13)$$

The NLC and the MF form a preliminary equalizer whose output $h_n$ is given by $h_n = c_n + z_n$ (14). The signal h is only affected by linear distortion, and can be processed by a VD the usual way.

SIMULATION RESULTS

Simulations were done with the optical parameters of the Compact Disc Digital Audio (CDDA) system as a reference: a numerical aperture of the objective NA=0.45, laser wavelength of 780 nm, and tangential velocity v=1.25 m/s. The definition of the energy per information bit may be ambiguous due to nonlinear terms. Hence, we use the following notation. Peak to peak uniform response to a long alternation of pits and lands is denoted $V_{pp}$. Then, for a bit duration T, a signal energy measure is given as $E=T(V_{pp}/2)^2$. The bit error rate (BER) was evaluated as a function of the signal-to-noise ratio $E/N_0$, where $N_0$ is the one-sided power spectral density of additive Gaussian noise.

Simulations have been done with various values for the information densities: for instance, 1.25×CDDA means that the spatial density is 1.25 times the CDDA density.

To get an idea of the effects of second order terms, we have measured the performance of MLSE while considering the second order nonlinear Volterra model, and also the linear model that ignores second order contributions.

Figure 2:
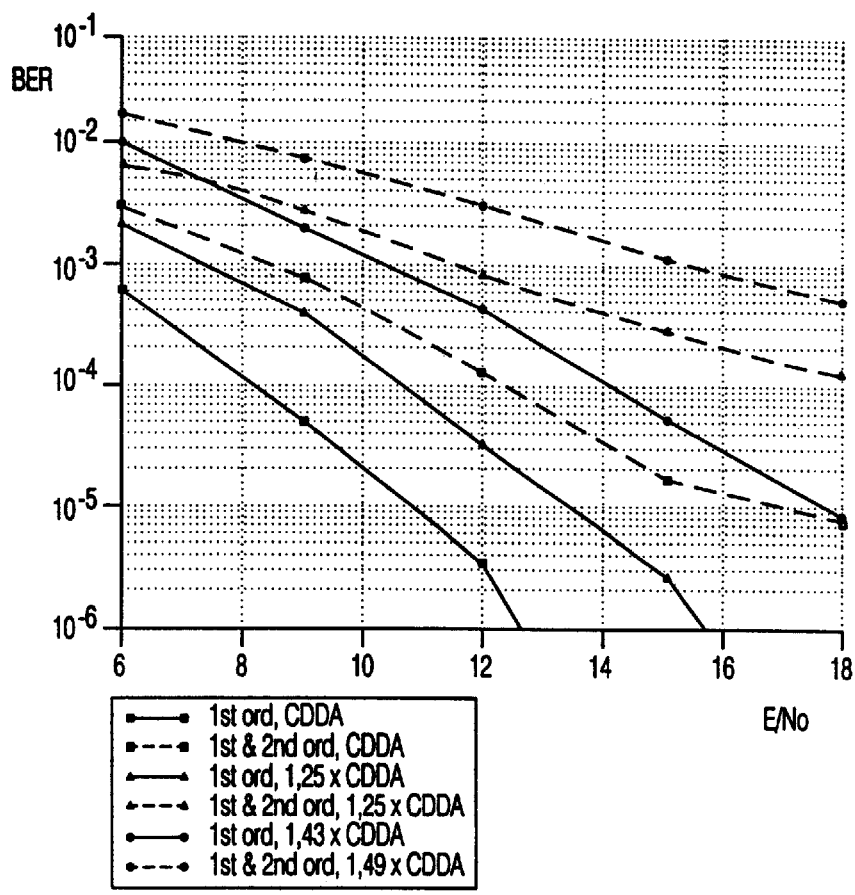
FIG. 2, performance of MLSE versus $E/N_0$ for linear (continuous line) and non-linear channel models.

FIG. 2 shows the performance of MLSE for linear (continuous line) and non-linear (dashed line) channel models. Degradation due to non-linearity is obvious. The MLSE had an adaptive matched filter with N=11 taps and a trellis memory M=30.

Figure 3:
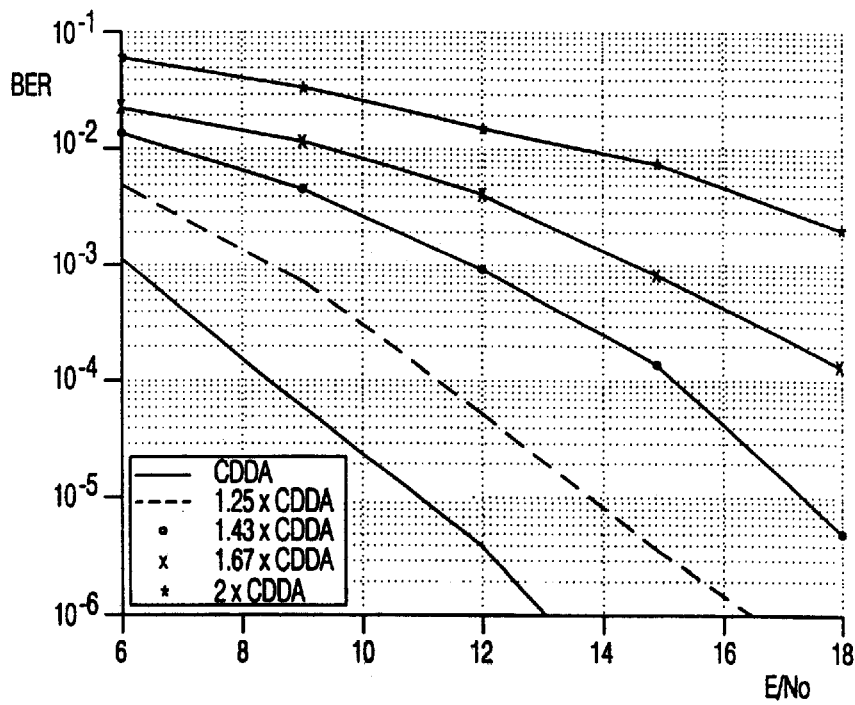
FIG. 3, performance for various information densities.

FIG. 3 shows NLR performance versus $E/N_0$ for various information densities between once and twice the CDDA density.

Figure 4:
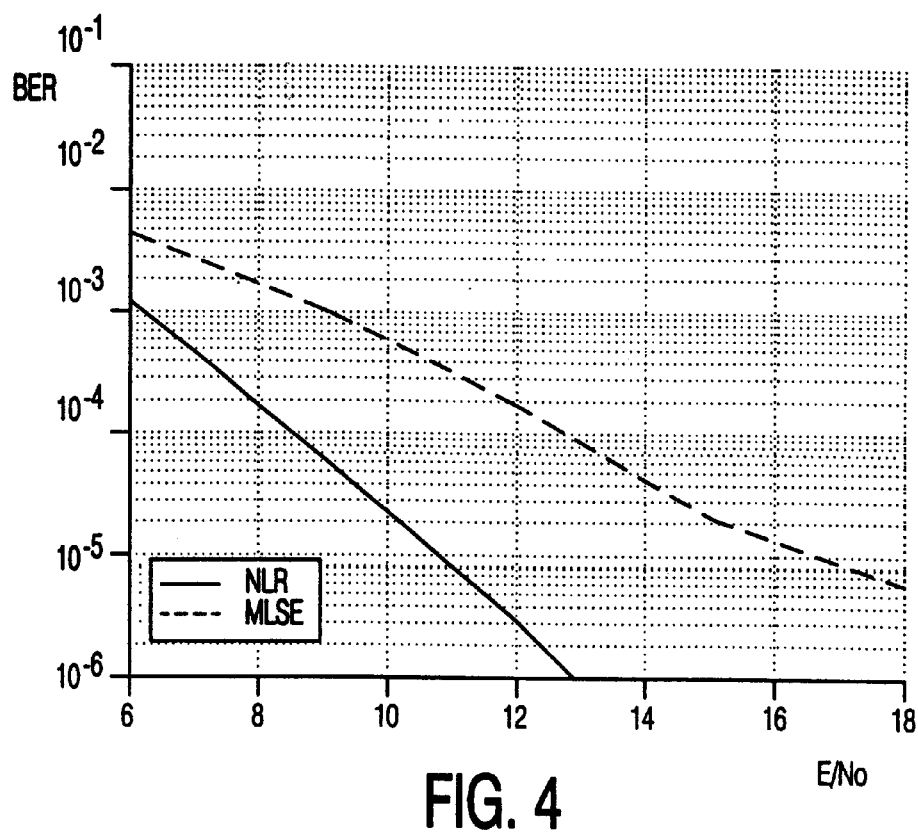
FIG. 4, performance of NLR and MLSE at CDDA density.

FIG. 4 compares NLR with MLSE at the CDDA density. Even with little non-linear ISI, NLR improves significantly over MLSE, that is the optimum receiver for a linear channel. Performance improvement is greater at higher information densities.

Figure 5:
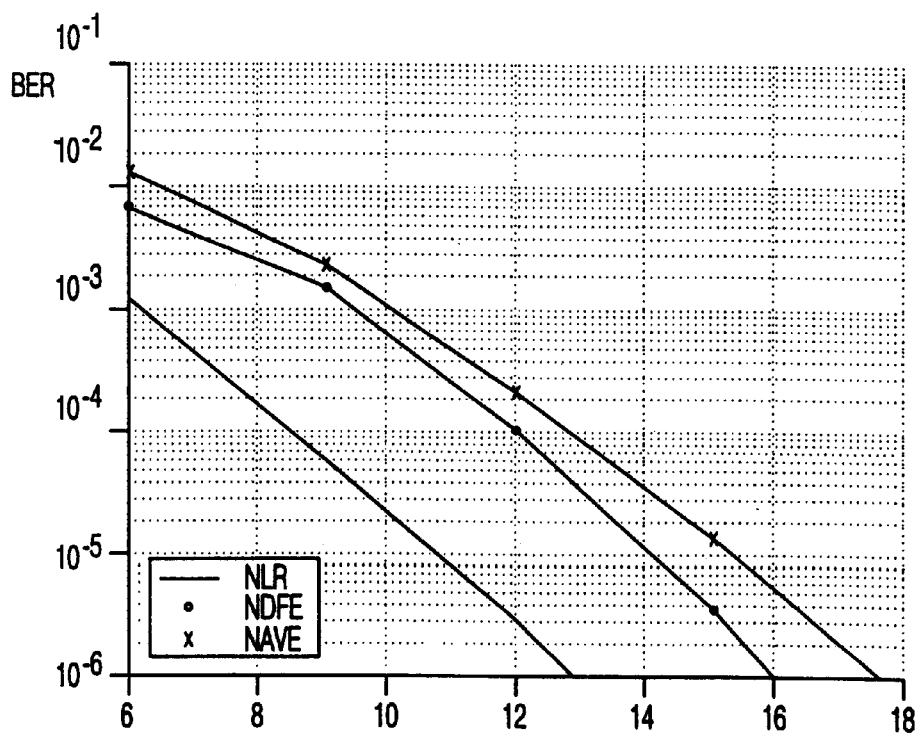
FIG. 5, performance of NAVE, NDFE, NLR at CDDA density.

FIG. 5 shows that NLR performs significantly better than symbol-by-symbol equalizers introduced for non-linear channels, namely NAVE and NDFE, at the CDDA density. Similar considerations hold for higher information densities. Performance has been compared between the NLR used for a non-linear channel, and MLSE applied to the linear part only of the channel by ignoring the second order Volterra kernel. With a reference of BER=$10^{-3}$, the comparison has shown that NLR has lower performance than MLSE, of only 0.2 dB, 0.3 dB, 0.5 dB, and 0.6 dB, at the respective densities CDDA, 1.25×CDDA, 1.43×CDDA, and 1.67×CDDA. Since MLSE is an optimum receiver for the linear channel, NLR apparently cancels almost all non-linear ISI terms. In fact, NLR achieves a performance that is close to the optimum non-linear receiver.

An NLR can be simplified by using fewer linear and non-linear taps, and a trellis for the VD with fewer states and limited path truncation length. For the parameters in the Table, the $E/N_0$ degradation is less than 1 dB, up to BER=$10^{-5}$.

|  | NLR | Simplified |
| --- | --- | --- |
| linear taps | 19 | 5 |
| non-linear taps | 39 | 11 |
| number of states | 512 | 32 |
| path truncation length | 30 | 15 |

The performance of NMLSE applied to the non-linear channel appears close to the performance of MLSE to the linear channel. This appears to prove that NMLSE is the parallel of MLSE in a linear environment, and therefore, as a structure to approach optimum receiver performance. Furthermore, the above method is not restricted to only an optical channel environment, but is valid for the detection of any signal that is affected by the same kind of distortion, thus for any signals that are affected by second order non-linear distortion where the contributions by first and second orders are uncorrelated. The method allows a drastic simplification of the computational complexity on an MLSE detection structure, making possible then a rather simple implementation in line with available technologies.

What is claimed is:

1. A method for performing Maximum Likelihood Sequence Estimation (MLSE) on a received signal that is affected by non-linear distortion, characterized by the step of producing a cleaned signal by removing non-linear inter-symbol-interference (ISI) through a non-linear Volterra canceller which is a simplified structure with respect to a Volterra Equalizer, and which only processes the non-linear distortion, followed by applying a Viterbi Detector which processes this cleaned signal in the manner of a linear signal, and which estimates appropriate metrics accordingly, said method further comprising adaptively controlling coefficients of at least one of the non-linear Volterra canceller and a matched filter, said adaptively controlling comprising iteratively updating said coefficients in accordance with an iterative updating algorithm.

2. A method for performing Maximum Likelihood Sequence Estimation (MLSE) on a received signal that is affected by non-linear distortion, characterized by the step of producing a cleaned signal by removing non-linear inter-symbol-interference (ISI) through a non-linear Volterra canceller which is a simplified structure with respect to a Volterra Equalizer, and which only processes the non-linear distortion, followed by applying a Viterbi Detector which processes this cleaned signal in the manner of a linear signal, and which estimates appropriate metrics accordingly, said method further comprising operating an adaptive matched filter in parallel with said producing.

3. A method for performing Maximum Likelihood Sequence Estimation (MLSE) on a received signal that is affected by non-linear distortion, characterized by the step of producing a cleaned signal by removing non-linear inter-symbol-interference (ISI) through a non-Linear Volterra canceller which is a simplified structure with respect to a Volterra Equalizer, and which only processes the non-linear distortion, followed by applying a Viterbi Detector which processes this cleaned signal in the manner of a linear signal, and which estimates appropriate metrics accordingly, wherein said removing is effected in a chain comprising a non-linear combiner and the non-linear Volterra canceller.

4. The method of claim 2, wherein outputs of said matched filter and said non-linear Volterra canceller are combined before feeding said Viterbi Detector.

5. A method for performing Maximum Likelihood Sequence Estimation (MLSE) on a received signal that is affected by non-linear distortion, characterized by the step of producing a cleaned signal by removing non-linear inter-symbol-interference (ISI) through a non-linear Volterra canceller which is a simplified structure with respect to a Volterra Equalizer, and which only processes the nonlinear distortion, followed by applying a Viterbi Detector which processes this cleaned signal in the manner of a linear signal, and which estimates appropriate metrics accordingly, said method further comprising providing an autocorrelation estimation of the signal received for feeding to said Viterbi Detector.

6. The method of claim 5, said method further comprising feeding said autocorrelation with an output of said Viterbi Deflector.

7. A method for performing Maximum Likelihood Sequence Estimation (MLSE) on a received signal that is affected by non-linear distortion, characterized by the step of producing a cleaned signal by removing non-linear inter-symbol-interference (ISI) through a non-linear Volterra canceller which is a simplified structure with respect to a Volterra Equalizer, and which only processes the non-linear distortion, followed by applying a Viterbi Detector which processes this cleaned signal in the manner of a linear signal, and which estimates appropriate metrics accordingly, removing being restricted to a second order kernel response.

8. The method of claim 1, wherein the iterative updating algorithm comprises a steepest descent algorithm.

9. A system for performing Maximum Likelihood Sequence Estimation (MLSE) on a received signal that is affected by non-linear distortion, comprising:
   a non-linear Volterra canceller for producing a cleaned signal by removing non-linear inter-symbol-interference (ISI) from the received signal, wherein the Volterra canceller is comprised by a Volterra equalizer, and wherein the Volterra canceller only processes the non-linear distortion;
   a Viterbi Detector for processing the cleaned signal and computing metrics relating to the cleaned signal; and
   means for adaptively controlling coefficients of at least one of the non-linear Volterra canceller and a matched filter, said adaptively controlling comprising iteratively updating said coefficients in accordance with an iterative updating algorithm.

10. The system of claim 9, wherein the iterative updating algorithm comprises a steepest descent algorithm.

11. A system for performing Maximum Likelihood Sequence Estimation (MLSE) on a received signal that is affected by non-linear distortion, comprising:
   a non-linear Volterra canceller for producing a cleaned signal by removing non-linear inter-symbol-interference (ISI) from the received signal, wherein the Volterra canceller is comprised by a Volterra Equalizer;
   a Viterbi Detector for processing the cleaned signal and computing metrics relating to the cleaned signal; and
   an adaptive matched filter adapted to operate in parallel with said non-linear Volterra canceller.

12. The system of claim 11, wherein outputs of said matched filter and said non-linear Volterra canceller are combined.

13. A system for performing Maximum Likelihood Sequence Estimation (MLSE) on a received signal that is affected by non-linear distortion, comprising:
   a non-linear Volterra canceller for producing a cleaned signal by removing non-linear inter-symbol-interference (ISI) from the received signal, wherein the Volterra canceller is comprised by a Volterra equalizer;
   a non-linear combiner, wherein said removing is effected in a chain comprising the non-linear combiner and the non-linear Volterra canceller; and
   a Viterbi Detector for processing the cleaned signal and computing metrics relating to the cleaned signal.

14. A system for performing Maximum Likelihood Sequence Estimation (MLSE) on a received signal that is affected by non-linear distortion, comprising:
   a non-linear Volterra canceller for producing a cleaned signal by removing non-linear inter-symbol-interference (ISI) from the received signal, wherein the Volterra canceller is comprised by a Volterra Equalizer;
   a Viterbi Detector for processing the cleaned signal and computing metrics relating to the cleaned signal; and
   an autocorrelation estimator adapted to provide an autocorrelation estimation of the signal received for feeding to said Viterbi Detector.

15. The system of claim 14, wherein an output of the Viterbi Detector is adapted to be fed into the autocorrelation estimator.

16. A system for performing Maximum Likelihood Sequence Estimation (MLSE) on a received signal that is affected by non-linear distortion, comprising:
   a non-linear Volterra canceller for producing a cleaned signal by removing non-linear inter-symbol-interference (ISI) from the received signal, wherein the Volterra canceller is comprised by a Volterra Equalizer, and wherein said removing is restricted to a second order kernel response; and
   a Viterbi Detector for processing the cleaned signal and computing metrics relating to the cleaned signal.

* * * * *